United States Patent
Zhou et al.

(10) Patent No.: US 9,884,961 B2
(45) Date of Patent: Feb. 6, 2018

(54) PHOSPHAZENE FLAME RETARDANT POLYCARBONATE COMPOUNDS

(71) Applicant: PolyOne Corporation, Avon Lake, OH (US)

(72) Inventors: Chongfu Zhou, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 9 days.

(21) Appl. No.: 15/033,986

(22) PCT Filed: Nov. 4, 2014

(86) PCT No.: PCT/US2014/063874
§ 371 (c)(1),
(2) Date: May 3, 2016

(87) PCT Pub. No.: WO2015/069642
PCT Pub. Date: May 14, 2015

(65) Prior Publication Data
US 2016/0272812 A1    Sep. 22, 2016

Related U.S. Application Data

(60) Provisional application No. 61/899,938, filed on Nov. 5, 2013.

(51) Int. Cl.
*C08L 69/00* (2006.01)
*C08K 5/5399* (2006.01)
*C08G 77/30* (2006.01)
*C08L 83/14* (2006.01)

(52) U.S. Cl.
CPC ............. *C08L 69/00* (2013.01); *C08G 77/30* (2013.01); *C08K 5/5399* (2013.01); *C08L 83/14* (2013.01)

(58) Field of Classification Search
CPC .................................................... C08L 69/00
USPC ....................................................... 524/156
See application file for complete search history.

(56) References Cited

U.S. PATENT DOCUMENTS

| | | |
|---|---|---|
| 3,931,100 A | 1/1976 | Mark |
| 3,933,734 A | 1/1976 | Mark et al. |
| 4,596,832 A | 6/1986 | Ariga et al. |
| 4,710,549 A | 12/1987 | Pettigrew |
| 4,720,533 A | 1/1988 | Pettigrew |
| 5,973,041 A | 10/1999 | Campbell et al. |
| 6,013,686 A | 1/2000 | Hamilton et al. |
| 6,339,166 B1 | 1/2002 | Allcock et al. |
| 6,392,008 B1 * | 5/2002 | Allcock ................ C08G 77/42 525/287 |
| 6,518,336 B1 | 2/2003 | Yabuhara et al. |
| 6,518,357 B1 | 2/2003 | Rajagopalan et al. |
| 6,743,841 B2 | 6/2004 | Shimizu et al. |
| 6,790,887 B1 | 9/2004 | Nishihara |
| 7,300,975 B2 | 11/2007 | Nodera et al. |
| 7,449,506 B2 | 11/2008 | Sato |
| 7,645,850 B2 | 1/2010 | Freitag |
| 7,816,486 B2 | 10/2010 | Freitag et al. |
| 7,985,788 B2 | 7/2011 | Shinagawa et al. |
| 8,101,678 B2 | 1/2012 | Roth |
| 8,158,701 B1 * | 4/2012 | Gallucci ................. C08L 69/00 524/128 |
| 8,236,881 B2 | 8/2012 | Roth |
| 8,372,902 B2 | 2/2013 | Lin et al. |
| 8,748,521 B2 | 6/2014 | Taschner et al. |
| 8,871,858 B2 | 10/2014 | Volkers et al. |
| 9,073,950 B2 | 7/2015 | Kownacka et al. |
| 2003/0220515 A1 | 11/2003 | Yoshifumi et al. |
| 2004/0176506 A1 | 9/2004 | Sicken et al. |
| 2005/0245670 A1 * | 11/2005 | Sato ..................... C08K 5/5399 524/537 |
| 2007/0191519 A1 | 8/2007 | Jiao et al. |
| 2014/0200349 A1 | 7/2014 | Brandstadt et al. |
| 2014/0249311 A1 | 9/2014 | Brandstadt et al. |
| 2016/0122534 A1 | 5/2016 | Zhou et al. |

OTHER PUBLICATIONS

Puyenbroek et al.: "Synthesis of Phosphazene-Substituted Polysiloxanes," Journal of Inorganic and Organometallic Polymers, 1991, pp. 105-114, vol. 1, No. 1, Plenum Publishing Corporation.
Hamdani et al: "Flame Retardancy of Silicone-Based Materials," Polymer Degradation and Stability, 2009, vol. 94, No. 4, pp. 465-495.
Tang et al.: "Oligomeric Siloxane Containing Triphenylphosphonium Phosphate as a Novel Flame Retardant for Polycarbonate," Polymer Degradation and Stability, 2012, vol. 97, No. 4, pp. 638-644.

* cited by examiner

*Primary Examiner* — Doris L Lee
(74) *Attorney, Agent, or Firm* — John H. Hornickel; Michael J. Sambrook

(57) ABSTRACT

A non-halogenated flame retardant polycarbonate compound is disclosed. The compound comprises a polycarbonate, a non-halogenated, non-migrating, non-plasticizing flame retardant adduct. The compound can achieve a UL 94 rating of V-0 at a thickness of at least 3.2 mm and otherwise achieves no dripping/igniting of the cotton indicator during that test. The adduct is formed from an allyl-functional phenoxyphosphazene and a hydride-functional polysiloxane.

15 Claims, No Drawings

PHOSPHAZENE FLAME RETARDANT POLYCARBONATE COMPOUNDS

CLAIM OF PRIORITY

This application claims priority from U.S. Provisional Patent Application Ser. No. 61/899,938 filed on Nov. 5, 2014, which is incorporated by reference.

FIELD OF THE INVENTION

This invention concerns thermoplastic polymer compounds which are flame retardant using non-halogenated ingredients.

BACKGROUND OF THE INVENTION

Thermoplastic compounds, unlike wood, metal, or glass, do not rot, rust, or shatter. For that reason, the world in the past seventy years has seen a revolution in material science arising from the combination of a thermoplastic resin and one or more functional additives to provide specific properties to the resin.

Unlike wood but like metal and glass, at a given temperature, a thermoplastic resin can melt. Its processing versatility benefits from its capacity to mix with the functional additives while in a molten state.

But in use, the exposure of a fully formed thermoplastic article to excessive heat or flame can be quite detrimental to property and person.

Flame retardants, drip suppressants, mineral fillers, and char formers are functional additives which can be used to help the thermoplastic compound to retard the effects of heat or flame from melting or even burning. Flame retardant thermoplastic compounds are particular needed when the plastic article is used in any confined space where persons might be present during any condition, planned or emergency, which might expose the plastic article to such excessive heat or flame.

Non-halogenated flame retardants have recently become popular because they minimize the release of halogenated chemicals if the plastic article would begin to degrade, melt, or burn.

To reduce the possibility of the plastic article dripping as it melts, polytetrafluoroethylene (PTFE) is often used as a drip suppressant. But PTFE, even in very small amounts, is a halogenated material, albeit fluorinated rather than chlorinated.

Unfortunately, plasticization is a very common phenomenon in plastics mixed with low molecular weight species, such as plasticizers and low molecular weight flame retardants. It tends to change thermal and mechanical properties of the given polymer resin and hence the compound in which the polymer resin is the main ingredient, such as lowering rigidity at room temperature, lowering heat distortion temperature, increasing elongation break and toughness. (Edmund H. Immergut and Herman F. Mark, Plasticization and Plasticizer Processes, Chapter 1, AMERICAN CHEMICAL SOCIETY, 1965).

Although plasticizers are widely used in the polymer industry using poly(vinyl chloride) resins and compounds, in other parts of the polymer industry, plasticization is typically avoided, especially in engineering thermoplastics.

Non-halogen flame retardant additives are generally low molecular weight chemicals, or oligomers, which have low melting points or glass transition temperatures, hence also they tend to reduce the Heat Distortion Temperature (HDT) of polymer systems by up to 30-40° C. depending on the amount of flame retardant additive(s) present. This decrease of HDT will significantly limit some applications of certain non-halogen flame retardant polymer compounds. Additionally, migration of these small molecular organic chemicals within a compound and high volatilization from the compound are also a concern.

Currently some persons skilled in the art are trying to incorporate some fillers into engineered thermoplastic compounds, such as talc, glass fiber etc, to counteract the HDT reduction described above. Other persons are choosing flame retardants with higher glass transition temperatures (Tg) or melting points as countermeasures; some are using inorganic solid salt flame retardants. Yet others are researching the applicability of polymeric non-halogenated flame retardants, such as polyphosphates, polyphosphazenes and polyphosphonates.

Flame dripping is a very critical issue in non-halogen flame retarded engineered thermoplastic compounds, such as those containing polycarbonate and polycarbonate blends. Typically a small amount (~0.5 weight percent of the total compound) of polytetrafluoroethylene (PTFE) is used for drip suppression.

But PTFE contains fluorine, which has been regarded in the industry as a "non-halogen" when discussing flame retardants, due to the low usage levels and less reactive nature of fluorinated polymers. However, with increasing desire for truly "halogen-free" polymer compound systems and usage of so-called "Green Materials", a completely non-halogen, non-fluorine-drip suppressant is needed.

SUMMARY OF THE INVENTION

What the art needs is a thermoplastic compound capable of passing the Underwriters' Laboratories Test No. 94 (UL 94 test) by achieving a V-0 rating, preferably completely non-halogenated.

Even with the variety of functional additives commercially available, it is not a predictable pathway for a person having ordinary skill in the art to find a particular combination of ingredients which, together, can achieve a V-0 rating in a UL 94 test without the use of any drip suppressant, flame retardant, or char former which contains any halogen atom.

The present invention has found a particular combination of known ingredients which are combined in the absence of solvent to react together and achieve a V-0 rating in a UL 94 test, at a thickness of about 3.2 mm (0.125 inches).

In this invention, a non-dripping, flame retardant polycarbonate compound is prepared, using a crosslinked phosphorous-containing silicone formed in-situ, without solvent, from an allyl-functional phenoxyphosphazene derivative and a hydride-functional siloxane via hydrosilylation with a platinum (Pt) catalyst in polycarbonate system.

While not limited to a particular theory, it is believed that the solvent-less reaction to form the crosslinked phosphorus-containing silicone establishes an in-situ generated interpenetrating network (IPN) which is a non-halogen flame retardant high molecular weight moiety within the polymer compound.

Furthermore, it is believed that this high molecular weight polymer formed in-situ has a higher Tg or melting point, which can also minimize the plasticization by a flame retardant on the polymer resin or other ingredients in the compound. Thus, it is believed that this IPN is non-flammable, suppresses dripping, and minimizes plasticization of the engineered polymer compound. Indeed the reaction of allyl functional phosphazene and reactive silicone produces high melting non-flammable solid, even though all starting materials are liquid at room temperature.

Also, it is believed that the IPN also reduces or minimizes migration of the flame retardant additive within the polymer compound.

Starting with polycarbonate as the thermoplastic resin chosen for its physical properties, a non-halogenated flame retardant is synthesized in situ and without solvent to achieve that coveted V-0 rating.

One aspect of the invention is a flame retardant polycarbonate compound, comprising (a) polycarbonate homopolymer or copolymer, (b) a crosslinked phosphorous-containing silicone formed without solvent from an allyl-functional phenoxyphosphazene derivative and a hydride-functional siloxane. Preferably, the compound is completely non-halogenated and formed in situ during melt mixing with the polycarbonate via hydrosilylation with a platinum catalyst.

Features of the invention will be explored below.

EMBODIMENTS OF THE INVENTION

Polycarbonate

Any polycarbonate is a candidate for use in the compound, whether obtained from petrochemical or bio-derived sources, whether virginal or recycled.

Polycarbonates can be branched or linear, a mixture of them being preferred in this invention. Polycarbonates can be aromatic. Without undue experimentation, one of ordinary skill in the art can select a polycarbonate matrix based on considerations of cost, manufacturing technique, physical properties, chemical properties, etc.

Unpredictably, it has been found that a combination of branched and linear polycarbonate in compounds of the present invention performs better than only either branched polycarbonate or linear polycarbonate. Linear polycarbonate has a higher melt flow index than branched polycarbonate, and it is believed that the linear polycarbonate assists in the melt processing of the compound while the branched polycarbonate assists in the flame retardant performance.

Commercial manufacturers of polycarbonate are SABIC, Bayer, Teijin, Dow, and others.

In-Situ Reaction Product of Non-Halogenated Allyl Phenoxyphosphazene and Hydride-Functional Siloxane To serve as a non-halogenated drip suppressant and a non-migrating, non-halogenated, non-plasticizing flame retardant, two ingredients of the compound await the flammable conditions before they react to become non-flammable. For purposes of this invention, "non-flammable" means a composition of matter having a Limiting Oxygen Index of greater than 22% according to ASTM Test D2863.

Allyl Phenoxyphosphazene

One ingredient to form the non-halogenated, non-migrating, non-plasticizing flame retardant and drip suppressant is an allyl phenoxyphosphazene.

For some, this allyl phenoxyphosphazene can be polymerized such as disclosed in U.S. Pat. No. 6,518,336 (Yabuhara et al.) and U.S. Pat. No. 6,743,841 (Shimizu et al.), both of which are incorporated by reference herein. Briefly, U.S. Pat. No. 6,518,336 discloses two types of phosphazenes as starting ingredients.

(1) Cyclic Phosphazenes Represented by the Formula (1)

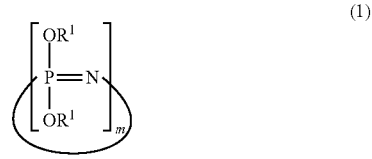

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group, or a hydroxy substituted phenyl.

(2) Straight-Chain Phosphazenes Represented by the Formula (2)

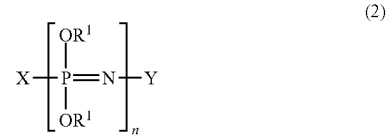

wherein n is an integer of 3 to 1000, $R^1$ is as defined above, X represents a group —N=P(OR$^1$)$_3$ or a group —N=P(O)OR$^1$, and Y represents a group —P(OR$^1$)$_4$ or a group —P(O)(OR$^1$)$_2$.

A commercially available allyl phosphazene is SPV-100 grade from Otsuka, which is a viscous brown liquid at room temperature. The SPV-100 grade is believed to be a mixture, presumably both having cyclic structure of Formula (1) and having a linear structure of Formula (2). The monomeric structure is shown below as Formula (3) with n from 3 to 15. n=3: 65-75%; n=4: 10-15%; n=5-15: 10%

Formula (3)

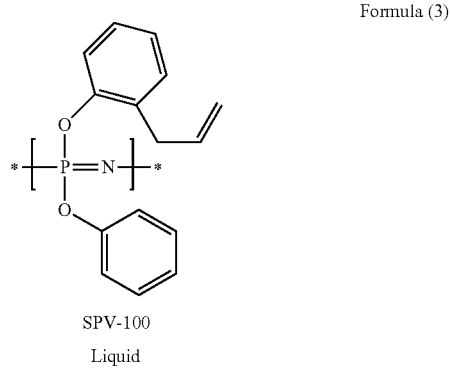

SPV-100
Liquid

Hydride-Functional Polysiloxane

The second ingredient to form the in-situ reaction product, also known as an adduct, is a hydride-functional polysiloxane, especially a homopolymer or copolymer of methyl hydrosiloxane moieties, and/or hydride terminated poly-disubstituted siloxanes, which can contain phenyl and other alkyl substitution on the silicon. Non-limiting examples of such hydride-functional polysiloxane are poly(methyl hydrosiloxane) homopolymer and methylhydrosiloxane-dimethylsiloxane copolymer, in which the percentage of methylhydrosiloxane and/or hydride terminal poly-dimethyl siloxane moieties can range from about 1 to about 99 weight percent and preferably from about 5 to about 99 weight percent. Commercially available copolymers include a 7-8% copolymer. As higher concentration methylhydrosiloxane copolymers, and hydride terminated poly-dimethylsiloxanes might become commercially available, they will be desirable for use in this invention. The homopolymer and copolymer are also commercially available from Gelest Inc and Power Chemical Corporation Inc.

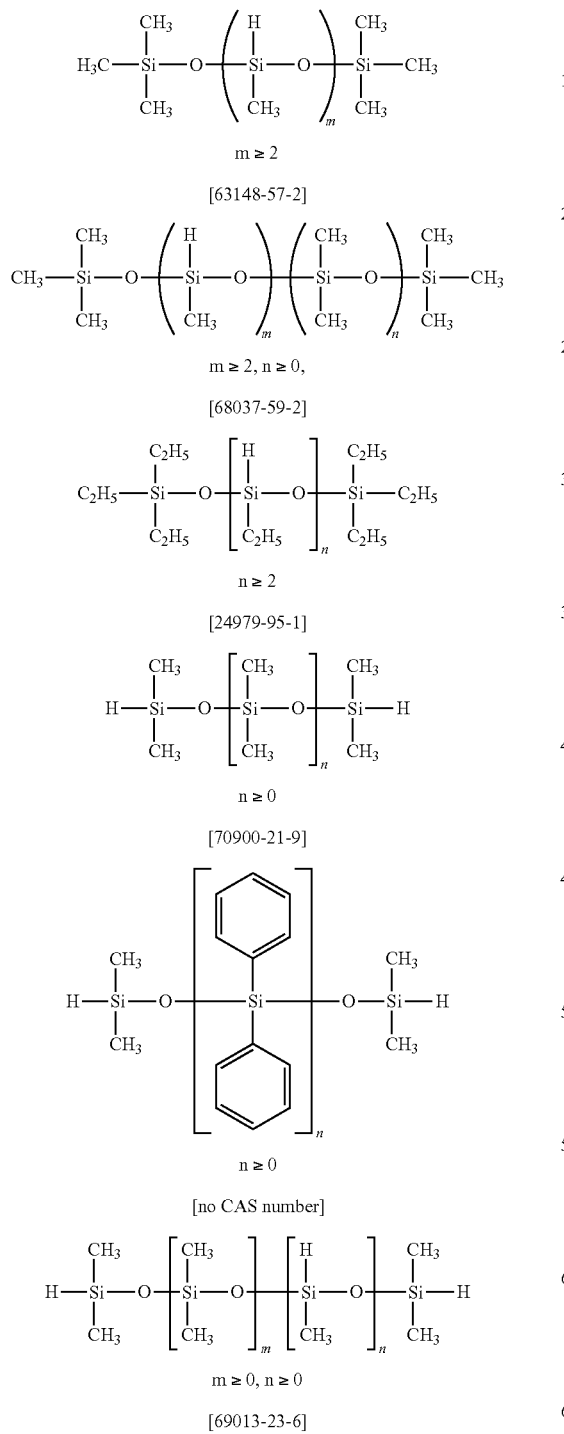

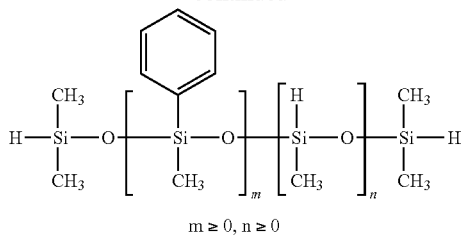

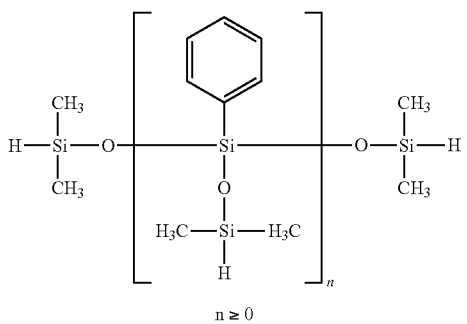

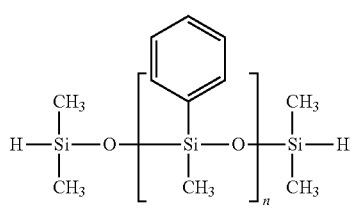

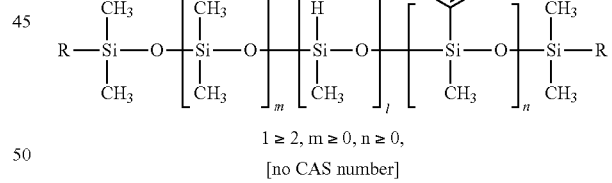

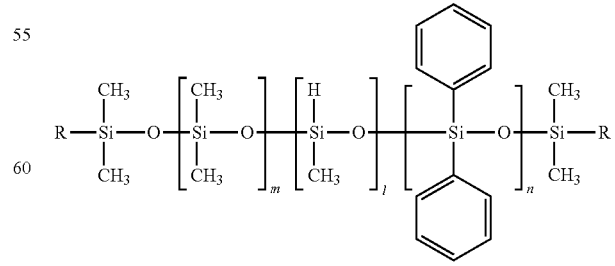

-continued

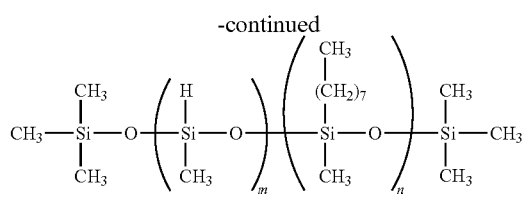

m ≥ 2, n ≥ 0
[68554-69-8]

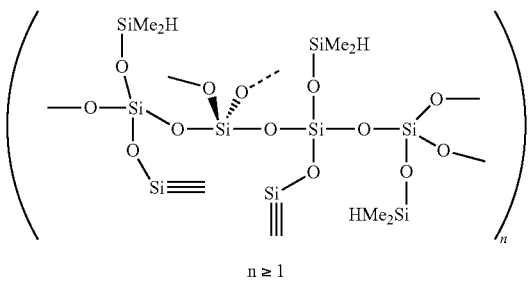

n ≥ 1
[68988-57-8]

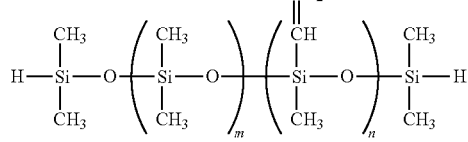

n ≥ 0, m ≥ 0
[no CAS number]

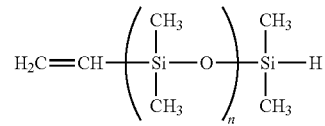

n ≥ 0
[no CAS number]

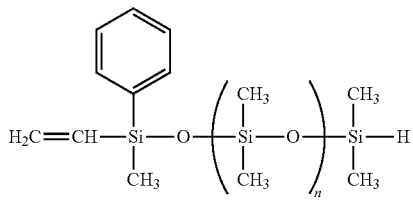

n ≥ 0
[no CAS number]

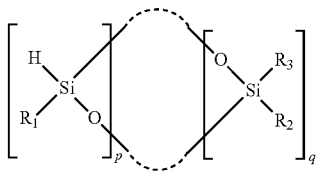

$2 \leq p \leq 6$, $0 \leq q \leq 6$, $3 \leq p+q \leq 8$, Cyclic siloxane hydride wherein p is an integer from 2 to 6, q is an integer from 0 to 6, p+q equals 3 to 8 and R1, R2 and R3 are independently selected from hydrogen and aliphatic and aromatic hydrocarbon groups and the p groups and q groups can be in series or not in series and together form a cyclic siloxane, also as described in U.S. Pat. No. 4,710,549.

The adduct is formed by an in-situ hydrosilylation reaction and is believed to react between the allyl functionality of the allyl phenoxyphosphazene and the hydride (Si—H) functionality resident on the methylhydrosiloxane homopolymer or copolymer. Because the allyl functionality of the allyl phenoxyphosphazene are capable of multiple reactions, the phosphazene becomes a crosslinking agent for adjacent methylhydrosiloxane polymers. Without being limited to a particular theory, drip suppression is achieved in compounds of the invention because the resulting crosslinked methylhydrosiloxanes are both non-flammable and networked within the polycarbonate resin upon exposure to sufficient temperatures to begin the crosslinking reaction. In the case where one silicone hydride moiety and one vinyl moiety reside on the same molecule, high molecular weight silicones will grow from the multifunctional phosphazene.

Moreover, the phosphazene serving as the enormous crosslinking agent not only provides the non-migration, non-plasticization properties, but also provide the non-halogenated flame retardance which is proven by the flame retardance properties of the polyphosphazenes identified in U.S. Pat. No. 6,518,336 (Yabuhara et al.) and U.S. Pat. No. 6,743,841 (Shimizu et al.)

One embodiment of the adduct formed from the in situ reaction of the allyl-functional phenoxyphosphazene and the hydride-functional siloxane is shown as Formula (4)

(4)

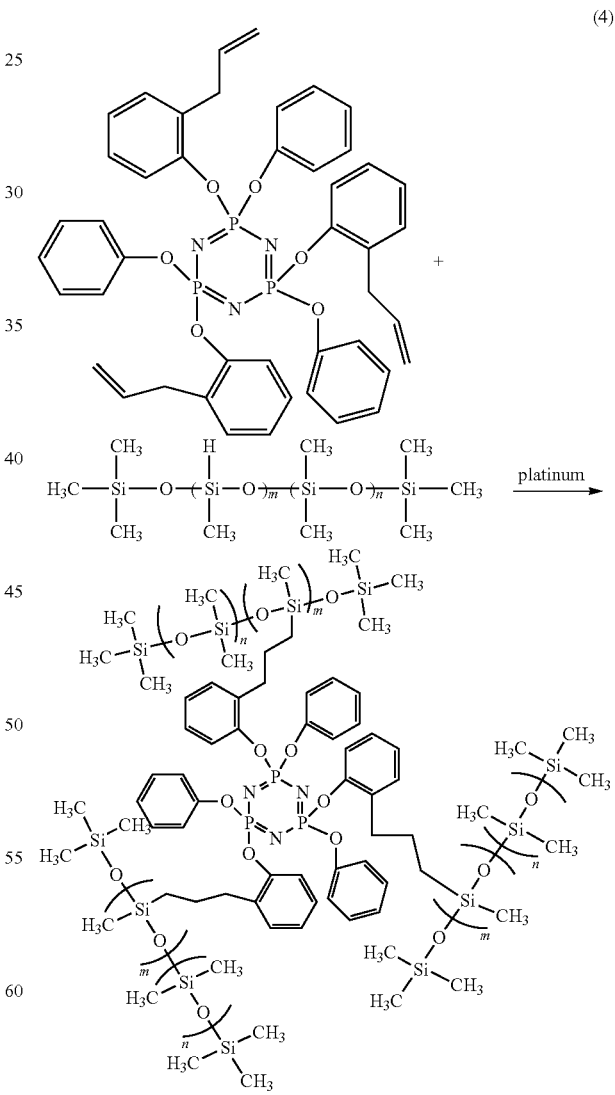

The reaction of the allyl functional phenoxyphosphazene and the methylhydrosiloxane polymer should be catalyzed.

For that purpose, a catalyst such as a platinum carbonyl complex (from Gelest Inc.) can be used, preferably with a platinum content of about 1-2.5 weight-percent. Other organo-metallics can be used as hydrosilylation catalysts such as Mn, Fe, V, Zr, Zn, Cu, Ti, and others which have been recently disclosed in PCT Patent Publications WO2013043912A2, WO2013043874A2, etc., the disclosures of which are incorporated by reference herein.

Optional Conventional Addition of Previously Formed Adduct

In addition to the preferred in situ formation of the adduct of the allyl-functional phenoxyphosphazene and the hydride-functional siloxane within the polymer compound during extrusion, or during fabrication, it is also possible to prepare the adduct by separate reaction and mix the resulting flame retardant into the polymer compound as one would mix in any other functional additive.

Optional Char Former

Flame retardant thermoplastic compounds can benefit from the presence of char formers, chemicals which assist in the retention of the original shape of the plastic article by the formation of char from the compound. The char forms a crust of non-flammable material, reducing the melting and dripping of the compound in which the char former resides.

Any non-halogenated material known to generate a char or crust in the presence of sufficient heat is a candidate for use as a char former in this invention. Non-limiting examples of such materials include diphenylmethane-4-sulfonic acid, calcium salt, inorganic salt of 4-nitro-beta-styrene sulfonate; a more complete listing can be found in U.S. Pat. Nos. 3,931,100 and 3,933,734 and others of Victor Mark, and, preferably, 3-phenylsulfonylbenzenesulfonic acid potassium salt, also known as potassium 3-(phenylsulfonyl)benzenesulfonate and having CAS No. 63316-43-8 and a structure as shown:

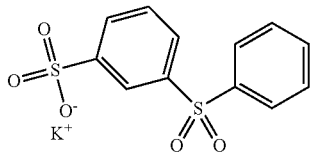 [SMILES: O=S(=O)([O-])c1cccc(S(=O)(=O)c2ccccc2)c1 ; [K+]]

Potassium 3-(phenylsulfonyl)benzenesulfonate is commercially available from a number of suppliers, including OM Group.

Optional Non-Halogenated Flame Retardants

Depending on the type of end use, it is possible that additional flame retardants might be useful in the compound. Four optional types of flame retardants are mentioned. Others known to those persons skilled in the art are also suitable candidates for use with this invention. However, one must keep in mind that the additional flame retardant may adversely affect heat distortion temperature (HDT) and impact resistance. Hence optimization of their use needs to be considered.

Bisphosphate Esters

Bisphosphate esters can be optional ingredients for use in this invention as additional flame retardant ingredients because they contain no halogen atom, which characterizes them as non-halogenated. One reason for using non-halogenated bisphosphate esters is that they are more economical as compared with other non-halogenated phosphorus-containing flame retardants.

Bisphosphate esters are commercially available and known as non-halogenated flame retardants. Specific examples of commercially available bisphosphate esters have the following structures and CAS Numbers:

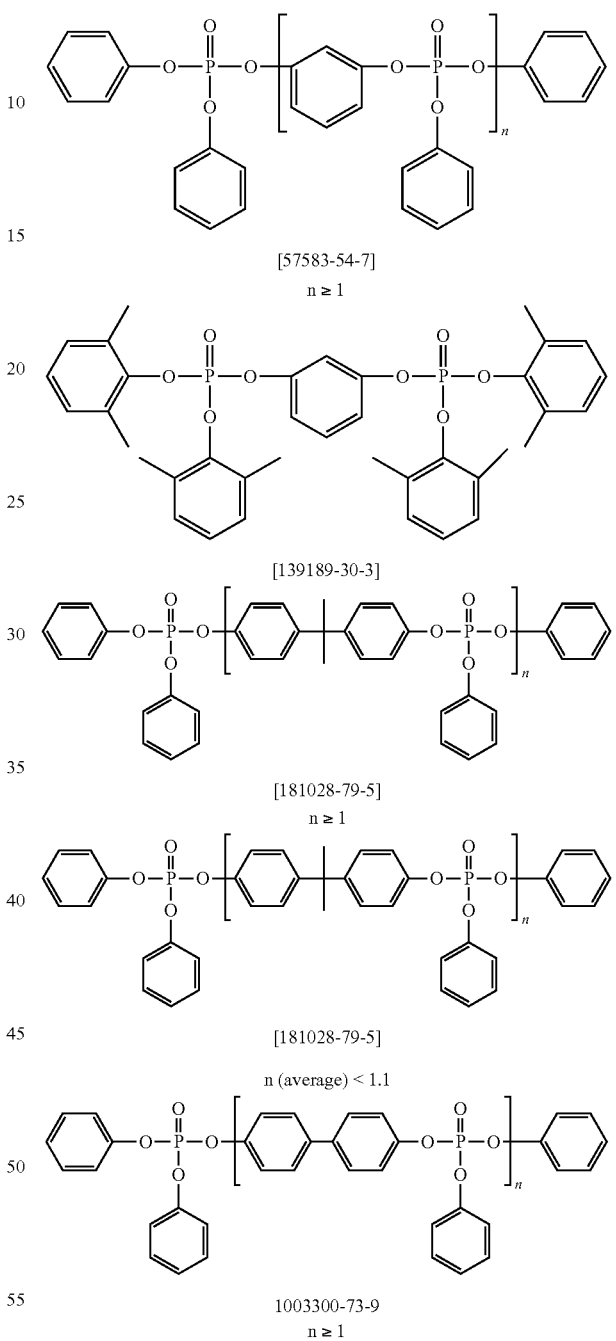

The foregoing examples of the non-halogenated bisphosphate esters can be used either alone or in combination. Of those examples listed above, all are pale yellow liquids except the second one, CAS No. 139189-30-3 and the last one, CAS No. 1003300-73-9, which are white granules. Granules are preferred for melt compounding because of easier solid material handling and processing. But liquid-based bisphosphate esters can also be used in the invention if suitable liquid material handling equipment such as dosing equipment is available for batch or continuous melt mixing with the polycarbonate and other solid ingredients.

Commercially available bisphosphate esters can be purchased from Adeka Palmarole of Saint Louis, France or Zhejiang Wangsheng Co., Ltd of Linhai City, Zhejiang Province, China. Presently preferred is WSFR-PX220 bisphosphate ester from Zhejiang Wangsheng Co. Ltd, because it is a white solid in granule form and has a melting point greater than 90° C.; a water content of less than 0.1 weight percent; and good compatibility with polycarbonate.

Polyphosphonates

Polyphosphonates used in this invention are polymer compounds containing repeating monomer units of $CH_3$—$PO(OH)_2$; $CH_3$—$PO(OH)$—$OR$, where R represents alkyl or aryl groups; or $R^1O$—$PO(R^3)$—$OR^2$, where $R^1$ and $R^2$ are aromatic or aliphatic and $R^3$ represents alkyl $C_1$-$C_6$ or aromatic. Polyphosphonates can be linear or branched. Preferred are polyphosphonate homopolymers having a polyphosphorous content of greater than about 8 weight percent, a glass transition temperature of at least about 100° C., and a limiting oxygen index of about 50% or higher. Polyphosphonate homopolymers for this invention have a high molecular weight represented by about 10,000 g/mol or higher; and preferably about 20,000 g/mol or higher. Oligomers can also be used with a molecular weight greater than 800 g/mol.

Alternatively, polyphosphonate-co-carbonate polymers can be used, which have an average molecular weight ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%. If the copolymer is used, the amount of polycarbonate resin for the matrix is concomitantly reduced.

FRX Polymers, Inc. of Chelmsford, Mass., USA manufactures flame retardant polyphosphonates, including polyphosphonate homopolymers, such as Nofia™ HM1100 and polyphosphonate-co-carbonate polymers, for example Nofia™ C06000, and oligomers, such as Nofia™ OL1001 Nofia™ OL3001, Nofia™ 3000 and Nofia™ 5000 and others as may identified at the FRX Polymers, Inc. website (frxpolymers.com) from time to time.

Polyphosphazene

In the event that additional polyphosphazene is desired, one can include previously reacted polyphosphazene flame retardants in the thermoplastic compounds of the invention because polyphosphazene flame retardants have excellent hydrolytic stability, better than bisphosphate esters, for example.

U.S. Pat. No. 6,518,336 (Yabuhara et al.) and U.S. Pat. No. 6,743,841 (Shimizu et al.), both of which are incorporated by reference herein, disclose non-halogenated polyphosphazenes which are candidates for use in this invention. Briefly, U.S. Pat. No. 6,518,336 discloses four types of polyphosphazenes.

(1) Cyclic Polyphosphazenes Represented by the Formula (1)

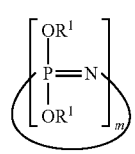

wherein m is an integer of 3 to 25, two $R^1$ groups are the same or different and each represents a phenyl group substituted with at least one group selected from the class consisting of alkyl groups having 1 to 6 carbon atoms and an allyl group or an unsubstituted phenyl group, or a hydroxy substituted phenyl.

(2) Straight-Chain Polyphosphazenes Represented by the Formula (2)

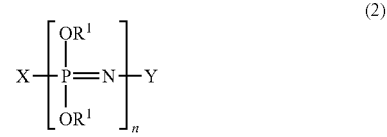

wherein n is an integer of 3 to 1000, $R^1$ is as defined above, X represents a group —N=$P(OR^1)_3$ or a group —N=$P(O)OR^1$, and Y represents a group —$P(OR^1)_4$ or a group —$P(O)(OR^1)_2$.

(3) Crosslinked polyphosphazenes wherein at least one of the foregoing phosphazenes (1) and (2) is crosslinked with at least one crosslinking group selected from the group consisting of o-phenylene, m-phenylene, p-phenylene, biphenylene, and a group represented by

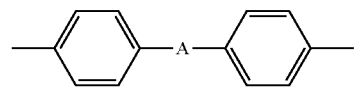

wherein A is a group —$SO_2$—, a group —S—, a group —O— or a group —$C(CH_3)_2$—, each of said crosslinking groups being interposed between the two oxygen atoms left after the elimination of group $R^1$ from the phosphazene (1) or (2), and the number of the $R^1$ groups in the crosslinked phosphazene being 50 to 99.9% based on the total number of $R^1$ groups in the phosphazene prior to the crosslinking.

(4) At least one polyphosphazene selected from the group consisting of cyclic polyphosphazenes represented by formula (3)

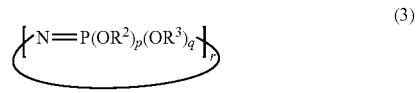

wherein $R^2$ is a cyano-substituted phenyl group; $R^3$ is an alkyl group having 1 to 18 carbon atoms or an aryl group having 6 to 10 carbon atoms; these groups may be substituted with at least one group selected from alkyl groups having 1 to 10 carbon atoms, allyl group and aryl groups; when two or more $R^3$ groups exist, the $R^3$ groups may be the same or different; p and q are numbers which fulfill the requirements that p>0, q. 0, and p+q=2; and r is an integer of 3 to 25, and a straight-chain polyphosphazene represented by the formula (4)

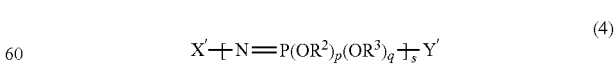

wherein $R^2$, $R^3$, p and q are as defined above; s is an integer of 3 to 1000; X' is a group —P(OR)41 a group —$P(OR^2)_3(OR^3)$, a group —$P(OR^2)_2(OR^3)_2$, a group —$P(OR^2)(OR^3)_3$, a group —$P(OR^3)_4$, a group —$P(O)(OR^2)_2$, a group —$P(O)(OR^2)(OR^3)$, or a group —P(O)

(OR³)₂; and Y' is a group —N═P(OR²)₃, a group —N═P (OR²)₂(OR³), a group —N═P(OR²)(OR³)₂, a group —N═P(OR³)₃, a group —N═P(O)OR² or a group —N═P (O)OR³.

The foregoing examples of the non-halogenated polyphosphazenes can be used either alone or in combination.

Specific examples of the cyclic polyphosphazene (1) and the straight-chain polyphosphazene (2) include a mixture of phosphazenes in which phenoxy groups and/or alkoxy groups are introduced as substituents and which are obtainable from a mixture of cyclic and straight-chain chlorophosphazenes, e.g., hexachlorocyclotriphosphazene, octachlorocyclotetra-phosphazene and the like, prepared by reacting ammonium chloride and phosphorus pentachloride at about 120 to about 130° C.; and hexaphenoxycyclotriphosphazene, octaphenoxycyclotetraphosphazene, decaphenoxycyclo-pentaphosphazene, hexaalkoxycyclotriphosphazene, octaalkoxycyclotetraphosphazene, decaalkoxycyclopentaphosphazene and like cyclic phosphazenes obtained by isolating, from the above mixture of chlorophosphazenes, hexachlorocyclotriphosphazene, octachlorocyclotetraphosphazene, decachlorocyclopenta-phosphazene or like single substances, followed by substitution with a phenoxy group and/or an alkoxy group.

Specific examples of the straight-chain polyphosphazenes (2) include those obtained by heating (at 220 to 250° C.) hexachlorocyclotriphosphazene for ring-opening polymerization to give dichlorophosphazene, followed by substitution with a phenoxy group and/or an alkoxy group.

Specific examples of the crosslinked polyphosphazenes (3) are phenoxyphosphazene having 4,4'-sulfonyldiphenylene(bisphenol-S residue) group-crosslinked structure, phenoxyphosphazene having 2,2-(4,4'-diphenylene)isopropylidene group-crosslinked structure, phenoxyphosphazene having 4,4'-oxydiphenylene group-crosslinked structure, phenoxyphoshazene having 4,4'-thiodiphenylene group-crosslinked structure, phenoxyphosphazene having 4,4'-diphenylene group-crosslinked structure, etc.

Specific examples of the polyphosphazenes (4) are monocyanophenoxypentaphenoxycyclotriphosphazene, dicyanophenoxytetraphenoxycyclotriphosphazene, tricyanophenoxytriphenoxycyclotriphosphazene, tetracyanophenoxydiphenoxycyclotriphosphazene, pentacyanophenoxymonophenoxycyclotriphosphazene and like cyclotriphosphazene compounds; monocyanophenoxyhepta-phenoxycyclotetraphosphazene, dicyanophenoxyhexaphenoxycyclotetraphosphazene, tricyanophenoxypentaphenoxy-cyclotetraphosphazene, tetracyanophenoxytetraphenoxy-cyclotetraphosphazene, pentacyanophenoxytriphenoxycyclotetraphosphazene, hexacyanophenoxydiphenoxy-cyclotetraphosphazene, heptacyanophenoxymonophenoxy-cyclotetraphosphazene and like cyclotetraphosphazenes; cyclopentaphosphazenes having both cyanophenoxy and phenoxy groups as substituents; and like cyclic phosphazenes; and straight-chain phosphazenes having both cyanophenoxy and phenoxy groups as substituents.

Among these polymers, preferred are a mixture of polyphenoxyphosphazenes which have phenoxy groups as substituents and which are obtainable from a mixture of cyclic and straight-chain chlorophosphazenes, phenoxyphosphazene having 4,4'-sulfonyldiphenylene-crosslinked structure; phenoxyphosphazene having 2,2-(4,4'-diphenylene)-isopropylidene group-crosslinked structure; and polyphosphazenes having both cyanophenoxy and phenoxy groups as substituents.

Commercially available polyphosphazenes can be purchased from Otsuka Chemical Co., Ltd. of Osaka, Japan. Presently preferred as an optional second flame retardant is SPB 100 polyphosphazene from Otsuka.

Polyphosphonates

Any polyphosphonate as disclosed in U.S. Pat. No. 7,645,850 (Freitag) to make the polyphosphonate-co-carbonate is also useful in this invention. More recently, branched polyphosphonates as disclosed in United States Patent Application Publication US20070032633 (Freitag et al.), incorporated by reference herein, have been disclosed and are useful.

Other Non-Halogenated Flame Retardants

A variety of other flame retardants are also candidates, including without limitation; Diethyl N,N bis (2-hydroxyethyl) aminomethylphosphonate (CAS No. 2781-11-5); Oligomeric ethyl ethylene phosphate (CAS No. 184538-58-7); Bisphenol A bis(diphenyl phosphate) (CAS No. 5945-33-5); Resorcinol bis(diphenyl phosphate) (CAS No. 125997-21-9), all marketed under the Fyrol™ or Fyrolflex™ brands by ICL. Preferably, poly-(m-phenylene methylphosphonate) (CAS No. 63747-58-0) marketed as Fyrol™ PMP is useful.

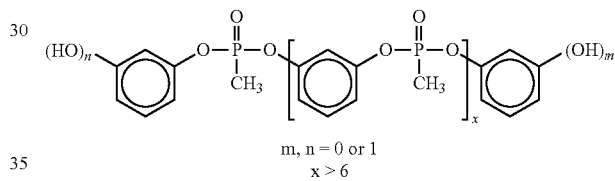

m, n = 0 or 1
x > 6

Other candidates are fusible zinc phosphinates as disclosed in United States Patent Application Publication US20040176506 (Burghardt et al.); 9,10-dihydro-9-oxa-10-phosphaphenanthrene-10-oxide (DOPO, CAS: 35948-25-5), and DOPO derivatives such as the DOPO-maleic anhydride adduct and the DOPO-benzoquinone adduct (10-(2,5-dihydroxyphenyl)-10H-9-oxa-10-phospha-phenantbrene-10-oxide, DOPO-HQ, CAS: 99208-50-1), DOPO/itaconic acid adduct, Ukanol FR 50®, Struktol® VP 3780 and Struktol® VP 3701 commercially available from Schill and Seilacher of Germany, other DOPO derivatives can be found in U. S. Patent Application Publication 2012/0095140 A1 and U.S. Pat. No. 8,101,678 B2. 2-carboxyethyl(methyl)phosphinic acid, and 2-carboxyethyl(phenyl)phosphinic acid

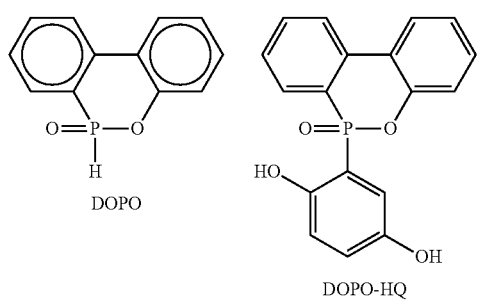

DOPO

DOPO-HQ

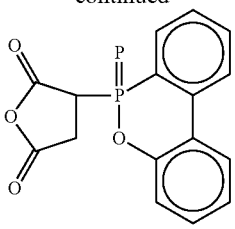

DOPO-maleic anhydride adduct

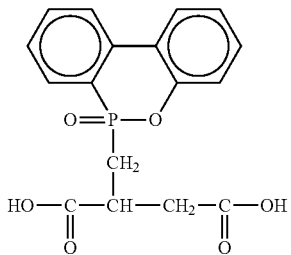

DOPO/itaconic acid adduct

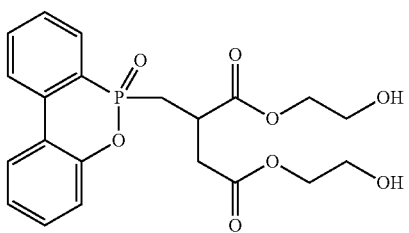

Ukanol FR 50®

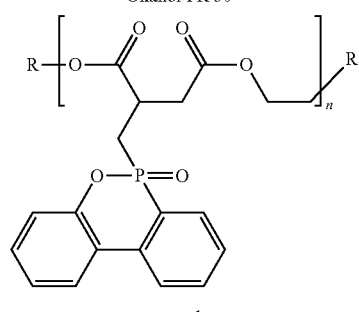

n ≥ 1

Struktol® VP 3780

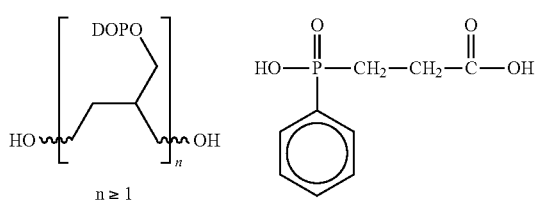

n ≥ 1

Struktol® VP 3701

2-carboxyethyl(phenyl) phosphinic acid

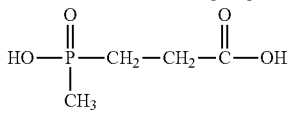

2-carboxyethyl(methyl) phosphinic acid and bisphosphoramidates as disclosed in U.S. Pat. No. 5,973,041 (Campbell et al.) as shown below

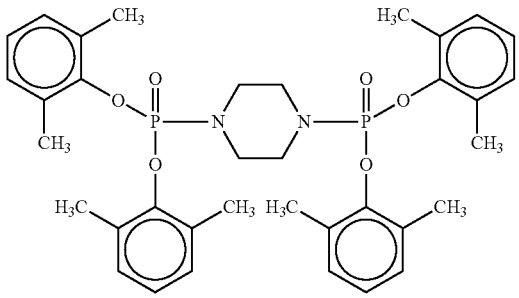

Optional Talc

Talc is used often in thermoplastic compounds as a mineral filler. In flame retardant thermoplastic compounds, talc can also assist in flame retardance by being a barrier to oxygen and increasing viscosity of the molten polymer matrix during combustion.

Talc can have a particle size ranging about 0.5 μm to about 10 μm and preferably from about 0.5 μm to about 0.9 μm.

Talc is commercially available from a number of manufacturers. Presently preferred is Ultra Talc 609 from Specialty Minerals Company, which has a particle size of from about 0.5 μm to about 0.9 μm.

Optional Other Additives

The compound of the present invention can include conventional plastics additives in an amount that is sufficient to obtain a desired processing or performance property for the compound. The amount should not be wasteful of the additive nor detrimental to the processing or performance of the compound. The additive cannot contain halogenated materials. Those skilled in the art of thermoplastics compounding, without undue experimentation but with reference to such treatises as *Plastics Additives Database* (2004) from Plastics Design Library (elsevier.com website), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppressants; impact modifiers; initiators; lubricants; micas; pigments, colorants and dyes; plasticizers, such as core/shell impact modifiers; processing aids; release agents; silanes, titanates and zirconates; slip and anti-blocking agents; stabilizers; stearates; ultraviolet light absorbers; viscosity regulators; waxes; catalyst deactivators, scavengers and combinations of them.

Ingredients

Table 1 shows the acceptable, desirable, and preferred amounts of each of the ingredients discussed above, recognizing that the optional ingredients need not be present at all. The compound can comprise the ingredients, consist essentially of the ingredients, or consist of the ingredients. All amounts are expressed in weight percent of the total compound.

All ingredients other than the polycarbonate matrix can be added individually to the matrix or any two or more of them can be added together.

TABLE 1

Range of Ingredients (Weight Percent)

| | Acceptable | Desirable | Preferable |
|---|---|---|---|
| Polycarbonate Matrix | 50-99.9 | 80-99.9 | 90-99.9 |
| Allyl functional phenoxyphosphazene | 0.1-25 | 0.1-10 | 0.1-5 |
| Hydride-functional Polysiloxane | 0.1-25 | 0.1-10 | 0.1-5 |
| Platinum Catalyst Complex (1-2.5% Platinum) | 0.01-1 | 0.01-0.75 | 0.01-0.5 |
| Optional Non-Halogenated Char Former | 0-2 | 0-1.5 | 0-0.5 |
| Optional Talc | 0-9 | 0-5 | 0-2 |
| Optional Non-Halogenated Flame Retardant | 0-10 | 0-10 | 0-10 |
| Optional Other Additives | 0-5 | 0-3 | 0-2 |

Processing

The preparation of compounds of the present invention, and masterbatches for them, is uncomplicated. The compound can be made in batch or continuous operations.

Mixing in a continuous process typically occurs in a single or twin screw extruder that is elevated to a temperature that is sufficient to melt the polymer matrix with addition of other ingredients either at the head of the extruder or downstream in the extruder. Extruder speeds can range from about 50 to about 500 revolutions per minute (rpm), and preferably from about 350 to about 450 rpm. Typically, the output from the extruder is pelletized for later extrusion, molding, thermoforming, calendering, or additive manufacturing (3D printing) into polymeric articles.

Mixing in a batch process typically occurs in a Banbury mixer that is capable of operating at a temperature that is sufficient to melt the polymer matrix to permit addition of the solid ingredient additives. The mixing speeds range from 60 to 1000 rpm. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com website), one can make articles of any conceivable shape and appearance using compounds of the present invention.

Usefulness of the Invention

Thermoplastic compounds can be shaped by extrusion, molding, calendering, thermoforming, 3D printing, or other means of shaping into any plastic article usable in an interior or confined space where fire can cause personal injury or property damage. The compounds resist both burning and dripping.

Literally any plastic article useful in a human-occupied space such as a building, a vehicle, or a tunnel can benefit from the flame retardancy and drip suppression of this polycarbonate compound.

Because the physical properties of polycarbonate compounds are known, which are believed to not be deleteriously affected by the addition of the drip suppressants and char former, any plastic article which is currently made from a polycarbonate compound can now be made from the non-halogenated flame retardant compound of this invention.

Polycarbonate itself has superior flame retardant properties when compared to other polymer resins, such as polyolefins. The inherent flame retardant properties of polycarbonate assisted in achieving the UL 94 V-0 rating after the addition of the non-halogenated drip suppressant ingredients and the non-halogenated char former.

By achieving a UL 94 V-0 rating at a thickness as thin as 3.2 mm, it is known that a plastic article having any larger thickness will also achieve a UL 94 V-0 rating.

Thermoplastic articles are sold into the following markets: appliance, building and construction, consumer, electrical and electronic, healthcare, industrial, packaging, textiles, transportation, and wire and cable. Compounds of this invention can be used in any of those markets regardless of thickness above 3.2 mm, the thickness of four United States dime ($0.10) coins.

As stated repeatedly, Underwriters' Laboratories Test No. UL 94 serves as the litmus test for flame retardant thermoplastic compounds. As seen in Table 2, the V-0 rating is distinguished from V-1 and V-2 ratings, which are less acceptable if one is seeking the best flame retardance rating. For certain uses, V-1 is acceptable.

But for this invention, the focus of the invention is on the dripping of molten polymer and minimizing the plasticizing effect of flame retardant on the polymer matrix, and the successful Examples will be determined by whether the cotton indicator is ignited or any dripping occurs on to the cotton indicator by a compound preferably completely non-halogenated. Because optional non-halogenated flame retardants can be added, the determination of V-0 is less significant for this aspect of the present invention, although further embodiments would address the need for V-0 performance.

TABLE 2

| Criteria Conditions | V-0 | V-1 | V-2 |
|---|---|---|---|
| Afterflame time for each individual specimen $t_1$ or $t_2$ | ≤10 s | ≤30 s | ≤30 s |
| Total afterflame time for any condition set ($t_1$ plus $t_2$ for the 5 specimens) | ≤50 s | ≤250 s | ≤250 s |
| Afterflame plus afterglow time for each individual specimen after the second flame application ($t_2 + t_3$) | ≤30 s | ≤60 s | ≤60 s |
| Afterflame or afterglow of any specimen up to the holding clamp | No | No | No |
| Cotton indicator ignited by flaming particles or drops | No | No | Yes |

Examples provide data for evaluation of the unpredictability of this invention.

EXAMPLES

The following test methods were used on the Examples and Comparative Examples.

HDT (ASTM D648) was measured on the Tinius Olsen HDT from Tinius Olsen Inc (PA, USA) at heating rate of 2° C./min. Two measurements were made for each sample.

DSC (ASTM D7426) was performed on DSC Q20 from TA Instrument at heating rate of 20° C./min with nitrogen at flow rate 50 ml/min. Tg data was taken from the second heating.

Notched Izod Impact (ASTM D-256) was performed on a TMI Impact Tester with flame bars (⅛"×½"×5" [0.318 cm×1.27 cm×12.7 cm], cut in half and tested at room temperature randomly without regard to gate end or opposite end).

Table 3 shows the ingredients chosen for Examples 1-12 and Comparative Examples A-D.

TABLE 3

| Brand | Chemical | Purpose | Maker |
|---|---|---|---|
| Makrolon ® PC 2658 | Polycarbonate (12 g/10 min ASTM 1238) (CAS # 25971-63-5) | Matrix | Bayer Material Science |
| B225 | Irganox ® B225 | Heat and light stabilizer | Ciba |
| TEFLON ® 6C | Polytetrafluoroethylene (CAS #9002-84-0) | Anti-dripping agent | DuPont |
| SPY-100 | Allyl Phenoxyphosphazene | Flame retardant additive | Otsuka Chemical Co., Ltd |
| HMS-993 | Poly(methyl hydrosiloxane), viscosity: 30-45 cSt at 25° C. (CAS: #63148-57-2) | Non-Halogen anti-dripping/ minimizing plasticizing component | Gelest Inc |
| HMS-082 | 7-8% methylhydro siloxane-dimethylsiloxane copolymer, viscosity: 110-150 cSt at 25° C., (CAS #68037-59-2) | Non-Halogen anti-dripping/ minimizing plasticizing component | Gelest Inc |
| DF-1040 | 100% polymethyl hydrogensiloxane, viscosity: 15-40 cSt at 25° C. (CAS #63148-57-2) | Non-Halogen anti-dripping/ minimizing plasticizing component | GE Bayer Silicone |
| Platinum Carbonyl Complex | Platinum Carbonyl Complex (1.85-2.1% platinum) (CAS #73018-55-0) | Catalyst | Gelest Inc |

Comparative Examples A-D and Examples 1-3 were mixed in a Prism TSE 16 mm twin screw extruder (L/D=40) twin screw extruder with all raw materials fed at the throat at Barrel 1. The temperature in all zones was set at 300°. The extruder screw rotated at 350 rpm. The extrudate was pelletized, cooled on the belt, for later injection or compression molding.

Before molding, the pellets were dried for more than 6 hours at 80° C. to reduce moisture content to less than 0.02%.

Using a Nissei molding machine, Table 4 shows the settings used to mold test bars of each Example and Comparative Example having a thickness of 3.175 mm.

TABLE 4

| Molding Conditions | |
|---|---|
| Molding machines | 88 Nissei |
| Examples | 1-3 and A-D |
| Drying Conditions before Molding: | |
| Temperature (° C.) | 80 |
| Time (h) | 6 |
| Temperatures: | |
| Nozzle (° C.) | 282 |
| Zone 1 (° C.) | 277 |
| Zone 2 (° C.) | 271 |
| Zone 3 (° C.) | 266 |
| Mold (° C.) | 66 |
| Oil Temp (° C.) | 27 |
| Speeds: | |
| Screw RPM | 65% |
| Inj Vel Stg 1 | 30% |
| Inj Vel Stg 2 | 20% |
| Inj Vel Stg 3 | 20% |
| Inj Vel Stg 4 | 20% |
| Inj Vel Stg 5 | 20% |
| Pressures: | |
| Inj Press Stg- Time (sec) | 7 |
| Injection Pressure 1 | 90% |
| Hold Pressure 2 | 20% |
| Hold Pressure 3 | 0 |
| Back Pressure | 5% |
| Timers: | |
| Injection Hold (sec) | 7 |
| Cooling Time (sec) | 20 |
| Operation Settings: | |
| Shot Size (mm) | 38 |
| Cushion (mm) | 2.3 |

Table 5 shows the flame performance tested for Examples 1-3 and Comparative Examples A-D. What is apparent in Table 5 is that a normally plasticizing, non-halogen flame retardant can be made be much less plasticizing, as seen HDT and Tg values as compared to the control, yet while also retaining non-flammability characteristics as well as non-dripping behavior. It is particularly unexpected to be able to achieve these five parameters all at once: (1) non-plasticization, (2) retention of thermal properties, (3)non-flammability, (4) no dripping, and (5) retained transparency.

TABLE 5

| | Example | | | | | | |
|---|---|---|---|---|---|---|---|
| | A | B | C | 1 | 2 | 3 | D |
| Makrolon PC 2658 (12 MF Pellet) | 100 | 99.90 | 94.90 | 94.40 | 93.80 | 92.60 | 98.90 |
| B225 | | 0.10 | 0.10 | 0.10 | 0.10 | 0.10 | 0.10 |
| DuPont TEFLON 6C | | | | 0.50 | | | |
| SPV-100 | | | 5.00 | 5.00 | 5.00 | 6.00 | |
| Poly(methyl hydrosiloxane) HMS-993 | | | | | 1.00 | 1.20 | 1.00 |
| Platinum Carbonyl Complex | | | | | | | |
| (1.85-2.1% platinum) | | | | | | | |
| Total | 100.00 | 100.00 | 100.00 | 100.00 | 100.00 | 100.00 | 100.00 |
| Flame bar thickness | ⅛" | ⅛" | ⅛" | ⅛" | ⅛" | ⅛" | ⅛" |
| Dripped/Ignited cotton | Y | Y | Y | N | N | N | Y |
| UL rating | V2 | V2 | V2 | V0 | V1 | V1 | V2 |

TABLE 5-continued

| | Example | | | | | | |
|---|---|---|---|---|---|---|---|
| | A | B | C | 1 | 2 | 3 | D |
| Appearance of Flame Bars | Transparent | Transparent | Transparent | Opaque | Translucent | Translucent | Opaque |
| HDT (° C.) | 133.3 | — | 123.9 | 121.0 | 129.4 | 127.4 | 131.2 |
| Glass transition temperature (° C.) | 148.3 | — | 135.8 | 134.0 | 143.0 | 142.4 | 145.7 |

If one desires to include PTFE in spite of its halogen content, then Example 1 demonstrates V-0 properties.

Addition of a small quantity of Teflon® PTFE in to the PC/SPV-100 system can change from appearance from transparent to opaque. Addition of a small of quantity of Si—H into PC also makes it opaque. However, the combination of SPV-100/Si—H makes it translucent, and may get to transparency if the ratio of SPV-100/Si—H is adjusted.

As to impact, NHFR SPV-100 can lower impact of PC to less than 0.5 ft.lb/in, while addition of silicone hydride can push impact up to more than 1.5 ft.lb/in.

Also note the addition of Teflon® to SPV-100 as a drip suppressant lowers the impact, while the replacement of Teflon® by the hydrosilylation route increases the impact.

Examples 4-12

Examples 4-12 were screening experiments to demonstrate the synthesis of the crosslinked polymer resulting in the novel phosphazene flame retardant of the invention.

Example 4

High molecular weight polyphosphazene was prepared via crosslinking allyl phenoxyphosphazene (SPV-100) (SPV-100 from Otsuka Chemical Co., 11.4% P, viscous liquid at room temperature) with poly(methylhydrosiloxane) (HMS-993, Mn=2200-2400 g/mol, viscosity=30-45 cSt, Gelest Inc) under the influence of catalyst platinum carbonyl complex (1.85-2.1% platinum concentration).

3.0149 g SPV-100, 0.4898 g HMS-993 and 0.0031 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and started to form gel and solid. The reaction was stopped after 15 minutes. The product is a yellow solid which does not burn and drip.

Example 5

High molecular weight polyphosphazene was prepared via crosslinking allyl phenoxyphosphazene (SPV-100) (SPH-100 from Otsuka Chemical Co., 11.4% P, viscous liquid at room temperature) with 7-8% methylhydrosiloxane-dimethylsiloxane copolymer (HMS-082, Mn=5000-7000 g/mol, viscosity=110-150 cSt, Gelest Inc) under the influence of catalyst platinum carbonyl complex (1.85-2.1% platinum concentration).

3.0505 g SPV-100, 0.9935 g HMS-082 and 0.0088 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute. The reaction was stopped after 15 minutes. The product is a white solid.

Example 6

High molecular weight polyphosphazene was prepared via crosslinking allyl phenoxyphosphazene (SPV-100) (SPV-100 from Otsuka Chemical Co., 11.4% P, viscous liquid at room temperature) with 7-8% methylhydrosiloxane-dimethylsiloxane copolymer (HMS-082, Mn=5000-7000 g/mol, viscosity=110-150 cSt, Gelest Inc) under the influence of catalyst platinum carbonyl complex (1.85-2.1% platinum concentration).

3.0065 g SPV-100, 0.4928 g HMS-082 and 0.0034 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute. The reaction was stopped after 15 minutes. The product is a white solid.

Example 7

High molecular weight polyphosphazene was prepared via crosslinking allyl phenoxyphosphazene (SPV-100) (SPV-100 from Otsuka Chemical Co., 11.4% P, viscous liquid at room temperature) with 7-8% methylhydrosiloxane-dimethylsiloxane copolymer (HMS-082, Mn=5000-7000 g/mol, viscosity=110-150 cSt, Gelest Inc) under the influence of catalyst platinum carbonyl complex (1.85-2.1% platinum concentration).

3.1274 g SPV-100, 3.1240 g HMS-082 and 0.0067 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 15 minutes. The product is a rubbery white solid. It does not burn and drip.

Example 8

High molecular weight polyphosphazene was prepared via crosslinking allyl phenoxyphosphazene (SPV-100) (SPV-100 from Otsuka Chemical Co., 11.4% P, viscous liquid at room temperature) with 7-8% methylhydrosiloxane-dimethylsiloxane copolymer (HMS-082, Mn=5000-7000 g/mol, viscosity=110-150 cSt, Gelest Inc) under the influence of catalyst platinum carbonyl complex (1.85-2.1% platinum concentration).

2.774 g SPV-100, 3.9735 g HMS-082 and 0.0080 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 15 minutes. The product is a rubbery white solid. It does not burn and drip.

Example 9

High molecular weight polyphosphazene was prepared via crosslinking allyl phenoxyphosphazene (SPV-100) (SPV-100 from Otsuka Chemical Co., 11.4% P, viscous liquid at room temperature) with 7-8% methylhydrosiloxane-dimethylsiloxane copolymer (HMS-082, Mn=5000-7000 g/mol, viscosity=110-150 cSt, Gelest Inc) under the influence of catalyst platinum carbonyl complex (1.85-2.1% platinum concentration).

2.4257 g SPV-100, 1.5936 g HMS-082 and 0.0027 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 15 minutes. The product is a rubbery white solid.

Example 10

High molecular weight polyphosphazene was prepared via crosslinking allyl phenoxyphosphazene (SPV-100) (SPV-100 from Otsuka Chemical Co., 11.4% P, viscous liquid at room temperature) with poly(methylhydrosiloxane) (DF 1040, viscosity=15-40 cSt, GE Bayer Silicone) under the influence of catalyst platinum carbonyl complex (1.85-2.1% platinum concentration).

2.9416 g SPV-100, 0.4730 g DF 1040 and 0.0027 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 5 minutes. The product is a rubbery white solid.

Example 11

High molecular weight polyphosphazene was prepared via crosslinking allyl phenoxyphosphazene (SPV-100) (SPV-100 from Otsuka Chemical Co., 11.4% P, viscous liquid at room temperature) with poly(methylhydrosiloxane) (DF 1040, viscosity=15-40 cSt, Gelest GE Bayer Silicone) under the influence of catalyst platinum carbonyl complex (1.85-2.1% platinum concentration).

2.9241 g SPV-100, 0.4807 g DF 1040 and 0.0053 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 5 minutes. The product is a rubbery white solid.

Example 12

High molecular weight polyphosphazene was prepared via crosslinking allyl phenoxyphosphazene (SPV-100) (SPV-100 from Otsuka Chemical Co., 11.4% P, viscous liquid at room temperature) with poly(methylhydrosiloxane) (DF 1040, viscosity=15-40 cSt, GE Bayer Silicone) under the influence of catalyst platinum carbonyl complex (1.85-2.1% platinum concentration).

2.9130 g SPV-100, 0.4785 g DF 1040 and 0.0062 g platinum carbonyl complex (1.85-2.1% platinum concentration) were mixed in a Fisherbrand Aluminum Weighing Dish (40 ml) and heated on a 250° C. Corning® PC-420D stirring hot plate with manual physical stirring. The white mixture increase viscosity significantly in 1 minute, and then started to form gel and solid. The reaction was stopped after 5 minutes. The product is a rubbery white solid.

Examples 4-12 demonstrated that a variety of siloxanes can be used with allyl-functional phenoxyphosphazene resulting in a product that can be used with engineered polymer compounds to provide non-halogenated, non-migrating, non-plasticizing flame retardant and drip suppressant properties.

Examples 4-12 also demonstrated that that the flame retardant adducts identified above can be prepared under conditions present during reactive extrusion or in advance and then incorporated into the polymer compound via melt compounding.

The invention is not limited to the above embodiments. The claims follow.

What is claimed is:

1. A flame retardant polycarbonate compound, comprising:
    (a) polycarbonate homopolymer or copolymer,
    (b) a crosslinked phosphorous-containing silicone formed without solvent from an allyl-functional phenoxyphosphazene derivative and a hydride-functional siloxane.

2. The compound of claim 1, wherein the hydride-functional siloxane comprises a homopolymer or copolymer of methyl hydrosiloxane moieties, and/or hydride terminated poly-disubstituted siloxanes, which optionally contain phenyl and other alkyl substitution, in linear, cyclic, or oligomeric configuration.

3. The compound of claim 1, wherein the polycarbonate is a combination of linear polycarbonate and branched carbonate.

4. The compound of claim 1, wherein the hydride functional siloxane is poly(methyl hydrosiloxane) homopolymer or methylhydrosiloxane-dimethylsiloxane copolymer, or both, in which the percentage of methylhydrosiloxane and/or hydride terminal poly-dimethyl siloxane moieties can range from about 1 to about 99 weight percent.

5. The compound of claim 1, further comprising talc.

6. The compound of claim 1, further comprising a second non-halogenated flame retardant.

7. The compound of claim 6, wherein the second non-halogenated flame retardant is selected from the group consisting of bisphosphate esters, polyphosphonates, polyphosphazenes, and combinations thereof.

8. The compound of claim 1, wherein the reaction of the allyl-functional phenoxyphosphazene derivative and a hydride-functional siloxane occurs in situ during melt mixing with the polycarbonate via hydrosilylation with a platinum catalyst.

9. The compound of claim 8, wherein the compound when injection molded and tested at a thickness of 3.2 mm passes the dripping/igniting portion of UL 94 test.

10. The compound of claim 9, wherein the allyl-functional phenoxyphosphazene comprises
    (a) cyclic phosphazenes of Formula (1)

wherein m is an integer of 3 to 25, two R¹ groups are the same or different and each represents a phenyl group substituted with at least one group selected from the class consisting of alkyl groups having 1 to 6 carbon atoms and an allyl group or an unsubstituted phenyl group, or a hydroxy substituted phenyl or (b) straight-chain phosphazenes of Formula (2)

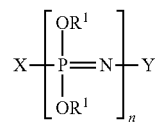

(2)

wherein n is an integer of 3 to 1000, R¹ is as defined above, X represents a group —N=P(OR¹)₃ or a group —N=P(O) OR¹, and Y represents a group —P(OR¹)₄ or a group —P (O)(OR¹)₂ or combinations thereof.

11. The compound of claim 1, further comprising adhesion promoters; biocides; anti-fogging agents; anti-static agents; bonding, blowing or foaming agents; dispersants; fillers or extenders; smoke suppressants; impact modifiers; initiators; lubricants; micas; colorants; plasticizers; impact modifiers; processing aids; release agents; silanes; titanates; zirconates; slip or anti-blocking agents; stabilizers; stearates; ultraviolet light absorbers; viscosity regulators; waxes; catalyst deactivators; or combinations of them.

12. The compound of claim 1, wherein the polycarbonate homopolymer is a mixture of a branched polycarbonate of virginal source, recycled source, or both, and a linear polycarbonate of virginal source, recycled source, or both and wherein the polycarbonate copolymer is polyphosphonate-co-carbonate.

13. The compound of claim 11, wherein the compound has ingredients in amounts expressed in weight percent:

| | |
|---|---|
| Polycarbonate Matrix | 50-99.9 |
| Allyl functional phenoxyphosphazene | 0.1-25 |
| Hydride-functional Polysiloxane | 0.1-25 |
| Platinum Catalyst Complex (1-2.5% Platinum) | 0.01-1 |
| Optional Non-Halogenated Char Former | 0-2 |
| Optional Talc | 0-9 |
| Optional Non-Halogenated Flame Retardant | 0-10 |
| Optional Other Additives | 0-5. |

14. A shaped article made from the compound of claim 1, wherein the shaping occurs by extrusion, molding, calendering, thermoforming, and additive manufacturing.

15. A method of using the compound of claim 1, comprising the step of shaping the compound into an article designed to resist combustion or molten dripping in the presence of flame.

* * * * *